US012584525B2

(12) United States Patent
Barthelme et al.

(10) Patent No.: US 12,584,525 B2
(45) Date of Patent: Mar. 24, 2026

(54) BEARING ASSEMBLY

(71) Applicant: AKTIEBOLAGET SKF, Gothenburg (SE)

(72) Inventors: Juergen Barthelme, Grettstadt (DE); Helmut Hauck, Euerbach (DE); Stefanie Seufert, Rothhausen (DE); Hubert Herbst, Gädheim (DE)

(73) Assignee: AKTIEBOLAGET SKF, Gothenburg (SE)

( * ) Notice: Subject to any disclaimer, the term of this patent is extended or adjusted under 35 U.S.C. 154(b) by 50 days.

(21) Appl. No.: 18/671,205

(22) Filed: May 22, 2024

(65) Prior Publication Data

US 2024/0309914 A1      Sep. 19, 2024

Related U.S. Application Data

(62) Division of application No. 17/824,931, filed on May 26, 2022, now Pat. No. 12,025,186.

(30) Foreign Application Priority Data

Jun. 8, 2021    (DE) .......................... 102021205785.3

(51) Int. Cl.
| | |
|---|---|
| *F16C 35/04* | (2006.01) |
| *F16C 19/06* | (2006.01) |
| *F16C 35/077* | (2006.01) |

(52) U.S. Cl.
CPC ............ *F16C 35/077* (2013.01); *F16C 19/06* (2013.01); *F16C 35/045* (2013.01)

(58) Field of Classification Search
CPC ...... F16C 19/06; F16C 35/045; F16C 35/077; F16C 2220/04; F16C 2220/06
See application file for complete search history.

(56) References Cited

U.S. PATENT DOCUMENTS

| | | | | |
|---|---|---|---|---|
| 2012/0206131 A1* | 8/2012 | Takei | .................... | F16C 41/007 |
| | | | | 324/207.25 |
| 2015/0267751 A1* | 9/2015 | Mola | ..................... | F16C 35/077 |
| | | | | 384/515 |
| 2015/0369293 A1* | 12/2015 | Mola | ....................... | F16C 19/54 |
| | | | | 384/564 |

(Continued)

FOREIGN PATENT DOCUMENTS

| | | |
|---|---|---|
| DE | 10355398 B3 | 7/2005 |
| DE | 102008007168 A1 | 8/2009 |

(Continued)

OTHER PUBLICATIONS

DE102018107876_A1_Description.*

*Primary Examiner* — Phillip A Johnson
(74) *Attorney, Agent, or Firm* — J-TEK LAW PLLC; Scott T. Wakeman; Mark A. Ussai

(57)      ABSTRACT

A method of forming a bearing assembly includes providing a bearing unit configured to support a rotatable component relative to a stationary component, the bearing unit including a stationary bearing ring and a rotatable bearing ring, and overmolding a material onto a portion of a radial surface of the stationary bearing ring, the portion being less than an entire radial surface of the stationary bearing ring, for example less than 75% of the entire radial surface of the stationary bearing ring, to form the stationary component.

16 Claims, 2 Drawing Sheets

(56)                    References Cited

U.S. PATENT DOCUMENTS

2020/0124089  A1      4/2020  Sarlin

FOREIGN PATENT DOCUMENTS

| DE | 102014204745 A1 | * | 9/2015 | ............. B22F 5/106 |
| DE | 102018107876 A1 | * | 10/2019 | ............ F16C 35/045 |
| DE | 102018209668 A1 | * | 12/2019 | ............ F16C 33/586 |
| DE | 102018124971 A1 | * | 4/2020 | ............ F16C 35/045 |
| DE | 102020125409 A1 | | 4/2021 | |
| EP | 2549136 A2 | | 1/2013 | |

* cited by examiner

BEARING ASSEMBLY

CROSS-REFERENCE

This application is a divisional of U.S. Ser. No. 17/824, 931, filed May 26, 2022, pending, which claims priority to German patent application no. 10 2021 205 785.3 filed on Jun. 8, 2022, the contents of which applications are fully incorporated herein by reference.

TECHNOLOGICAL FIELD

The present invention relates to a method of forming bearing assembly that includes a bearing unit having a stationary bearing ring and a rotatable bearing ring and a stationary component overmolded to a portion of the stationary bearing ring.

BACKGROUND

Rolling-element bearings can be used for supporting rotating components with respect to stationary components, for example as a non-locating or locating bearing for supporting a rotating shaft in a housing. Here the bearing rings are connected to the rotating and the stationary component, e.g., the housing and the shaft, such that this connection remains as constant as possible under all operating states and environmental conditions of the application. Thus, for example, a preinstalled bearing can be overmolded directly with the housing or a housing part. This does provide a fixed connection between the bearing and the housing or housing part; however damage to the bearing can be caused by high temperatures and/or high pressures that occur during the overmolding process.

SUMMARY

It is therefore an aspect of the present disclosure to provide a method of forming a bearing assembly using an overmolding process without damaging the bearing.

The disclosed bearing assembly includes a bearing unit that is configured to support a rotating component relative to a stationary component. The bearing unit includes a first stationary bearing ring and a second rotatable bearing ring, wherein the rotatable bearing ring is connectable to the rotating component, and wherein the stationary bearing ring is connectable to the stationary component, in particular a bearing carrier, such that they are rotationally fixed.

The bearing assembly can serve both as a non-locating bearing and as a locating bearing. In an implementation as a locating bearing, the stationary bearing ring is connected to the stationary component such that they are not only rotationally fixed, but also such that they are axially fixed. In an implementation as a non-locating bearing, the stationary bearing ring is indeed connected to the stationary component such that they are rotationally fixed but also axially displaceable in order to be able to compensate for thermal expansion.

In both cases the rotatable bearing ring is fixedly connectable to the rotating component. Such a fixed connectability can be provided, for example, by snap rings or a press seat.

The stationary component can be, for example, a housing. Alternatively the stationary component can also be a bearing carrier that is fixedly connectable to the housing, wherein in turn the stationary bearing ring is attached in the bearing carrier essentially such that they are rotationally fixed, but under certain circumstances the stationary bearing ring is axially displaceable. It is advantageous here in particular when the bearing assembly is provided as a preassembled unit made of a bearing carrier and a bearing unit. The entire bearing assembly can thereby easily be attached to the housing without the tolerances of the individual components having to be set separately and laboriously during installation.

In order to allow a connection of the bearing unit to the stationary component, in particular the bearing carrier, without damage to the bearing unit, the stationary component or the bearing carrier does not completely surround the bearing unit. This means that the stationary component contacts the bearing unit only in a limited region, and therefore during the shaping of the stationary component there is little contact of the hot metal of the stationary component and of the bearing unit. In this way the bearing unit is not compromised by high temperatures and pressures during the manufacture of the stationary component. In the limited region of contact, the bearing unit is embedded in the stationary component, in particular the bearing carrier, in an interference-fit or friction-fit manner, in order to ensure a secure attachment of the bearing unit to the stationary component.

In particular, a direct radially extending contact area between the stationary bearing ring and the stationary component can be smaller than the area of the axial end surface of the stationary bearing ring. Alternatively or additionally, the direct axially extending contact area between the stationary bearing ring and the stationary component can be smaller than 75% of the outer-diameter area or the inner-diameter area of the stationary bearing ring. Due to these small contact areas, damage to the bearing unit from high temperatures during the manufacture of the stationary component can be prevented.

According to a further embodiment, the stationary component is formed from a plastic, in particular a thermoplastic and/or a thermoset, and/or from a metal, in particular a light metal alloy. These materials have the advantage that on the one hand they can be injected or cast, and on the other hand make possible a light bearing assembly that is advantageous in many applications.

Thermosets are hard polymer materials that are cross-linked three-dimensionally via chemical primary valence bonds. They provide the advantage that they retain their strength in operation even with heat and have a low thermal expansion, which leads to a high dimensional stability. Although thermosets must be processed, in particular cured, at a high temperature, since there is only limited contact with the bearing unit also only a low heat input into the bearing unit occurs, so that despite the high processing temperature, no damage to the bearing unit occurs. This applies likewise for light metal alloys that are also hot-processed but due to the low level of contact cause no damage to the bearing unit.

Thermoplastics have the advantage that they can be processed at lower temperatures than thermosets, which further reduces the negative impact on the bearing unit by high temperatures during the manufacture of the stationary component or of the connecting element.

The stationary component can be disposed at least partially on the outer-diameter surface or the inner-diameter surface of the stationary bearing ring. If it is disposed on the outer-diameter surface, the stationary component can be, for example, a housing, or a bearing carrier that is connected to the housing. If it is disposed on the inner-diameter surface of the stationary bearing ring, the stationary component can be, for example, a hub, or a bearing carrier that is connected to the hub.

According to a further embodiment, the stationary bearing ring includes a retaining element, wherein the stationary bearing ring is connected to the stationary component via the retaining element. In particular, the retaining element can be embedded in the stationary component such that the retaining element represents (acts as) the stationary bearing ring. This means that instead of being formed directly around the stationary bearing ring, the stationary component is instead formed around the retaining element. In this way the contact during the molding process, e.g., injection-molding process, of the hot material of the stationary component with the bearing unit can be completely prevented or at least reduced, and damage to the bearing unit can thereby be prevented. Since the retaining element, which is fixedly connected to the bearing unit, is embedded in the stationary component, a stable connection between bearing unit and stationary component is nevertheless ensured.

In particular, the (injection-) molding tools can be configured such that they protect at least a large part of the bearing unit surface from a direct contact with the molding material. In addition, cooling devices in the molding tools can be configured to cool the bearing unit during the molding process. This also reduces thermal damage to the bearing unit.

The retaining element can be formed with the bearing unit as a preassembled unit, and here can preferably be connected to the bearing unit via an interference or friction fit. The bearing unit can be connected to the retaining ring, for example, via a transition or press-fit.

According to a further embodiment, the retaining element is comprised of a material, in particular metal, that has the same modulus of elasticity and/or the same coefficient of thermal expansion as the stationary bearing ring. This has the advantage that in operation there is no temperature-related change of the initial fit between the bearing ring and the retaining element.

According to a further embodiment, the retaining element is electrically conductive. If both the retaining element and the bearing unit are comprised of metal, charges or currents can be discharged via the metallic retaining element. For this purpose the retaining element can advantageously also be connected to the stationary component in an electrically conductive manner. This can be effected, for example, via an electrically conductive layer or an electrically conductive element in the stationary component. Furthermore, the retaining element can prevent the release of electromagnetic emissions from an electric motor if the stationary component is a housing of such an electric motor.

The retaining element can be a retaining ring, wherein the retaining ring is configured in particular sleeve-shaped or bowl-shaped. Here the retaining element is disposed in the form of the retaining ring completely surrounding the bearing unit. The retaining element can surround the stationary bearing ring on a side face of the latter by means of a flange.

The retaining element can be disposed on the outer-diameter surface or the inner-diameter surface of the stationary bearing ring. Depending on whether the stationary bearing ring is the inner ring or the outer ring, the retaining element is thus correspondingly disposed on the outer-diameter surface or the inner-diameter surface.

According to a further embodiment, the retaining element includes recesses that are fillable with the material of the stationary component. On the one hand a particularly good interference fit between the stationary component and the retaining element is achieved via these recesses. On the other hand, the recesses allow the penetration of the filler material into free spaces between the bearing ring and the retaining element, which achieves an improvement of the connection of the two elements to each other, in particular even when the bearing ring includes radial recesses that lead to an interference fit between the two elements due to the filling. At the same time, due to the filling of possible free spaces caused by manufacturing inaccuracies on one or both elements, an improved supporting of the bearing ring in the retaining element is realized, which positively affects the service life of the bearing assembly.

According to another embodiment, a method of forming a bearing assembly is provided that includes providing a bearing unit configured to support a rotatable component relative to a stationary component, the bearing unit including a stationary bearing ring and a rotatable bearing ring, and overmolding a material onto a portion of a radial surface of the stationary bearing ring, the portion being less than an entire radial surface of the stationary bearing ring to form the stationary component. The portion may be, for example, less than 75% of the entire radial surface of the stationary bearing ring.

According to a further embodiment, a method of forming a bearing assembly includes providing a bearing unit configured to support a rotatable component relative to a stationary component, the bearing unit including a stationary bearing ring and a rotatable bearing ring, mounting a retainer ring to a radial surface of the stationary bearing ring, and overmolding a material onto the retainer ring to form the stationary component on the retainer ring so that the stationary component overlies a portion of the radial surface of the stationary bearing ring that is less than an entire radial surface of the stationary bearing ring.

Further advantages and advantageous embodiments are specified in the description, the drawings, and the claims. Here in particular the combinations of features specified in the description and in the drawings are purely exemplary so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

Figures 1, 2:
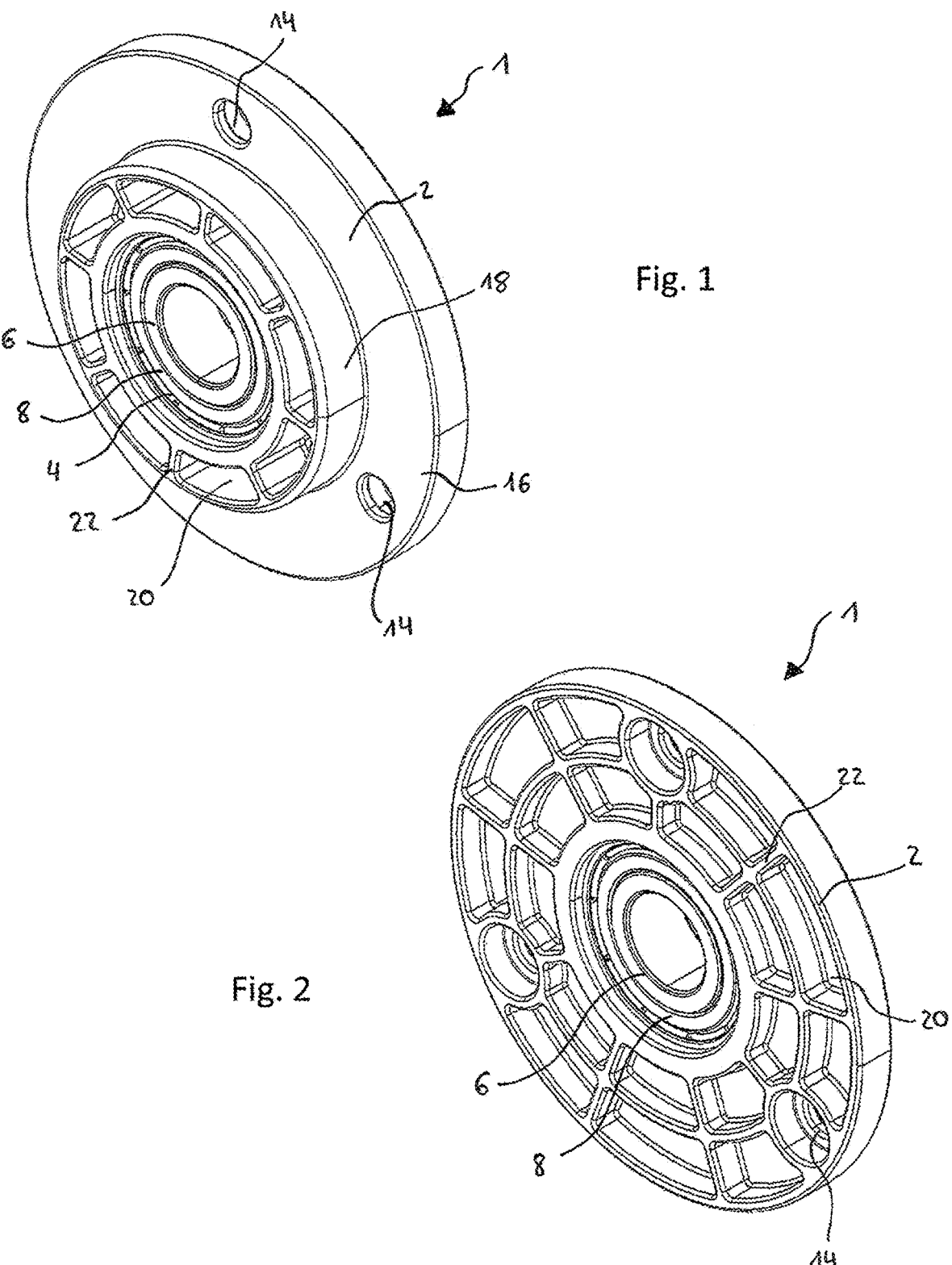
FIG. 1 is a first perspective view of a bearing unit disposed in a bearing carrier.
FIG. 2 is a second perspective view of the bearing unit disposed in a bearing carrier.

In the following, identical or functionally equivalent elements are designated by the same reference numbers.

The appended Figures show preferred exemplary embodiments of a bearing assembly 1 including a bearing carrier 2 in which a bearing unit 4 is disposed, the bearing unit 4 including an inner ring 6 and an outer ring 8. The exemplary embodiments depicted show a bearing assembly 1 that can be used, for example, for supporting a shaft in a housing, wherein the housing is stationary and the shaft is rotating. Of course, the bearing assembly 1 is also usable in other applications, for example, with a stationary pin and a rotating housing.

The inner ring 6 of the bearing unit 4 is configured as a rotatable bearing ring, and the outer ring 8 is configured as a stationary bearing ring and is connected to the bearing carrier 2. Between the bearing rings 6, 8, rolling elements 10 are disposed that are guided and held uniformly spaced by a cage 12 (see for this purpose in particular FIGS. 3 and 4).

In the exemplary embodiments depicted, the bearing unit 4 is configured as a ball bearing, but all other types of rolling-element bearings are also possible, such as, for example, roller bearings, or plain bearings.

For attaching to the housing (not depicted), the bearing carrier 2 includes receptacles, in this case through-openings 14, into which attachment means, for example, screws, can be introduced. Other receptacles are also possible, such as, for example, threaded collars or separate inserts.

In the exemplary embodiments depicted, the bearing carrier 2 includes a flange 16 including the receptacles 14 and a shoulder 18 in the center of which the bearing unit 4 is disposed. The flange 16 has a certain thickness in order to make possible a stable attachment to the housing. As is shown in FIG. 2, the flange 16 includes recesses 20 on one side. These serve to make the bearing carrier 2 lighter, while it simultaneously remains stable due to the remaining bridges 22.

Figure 3:
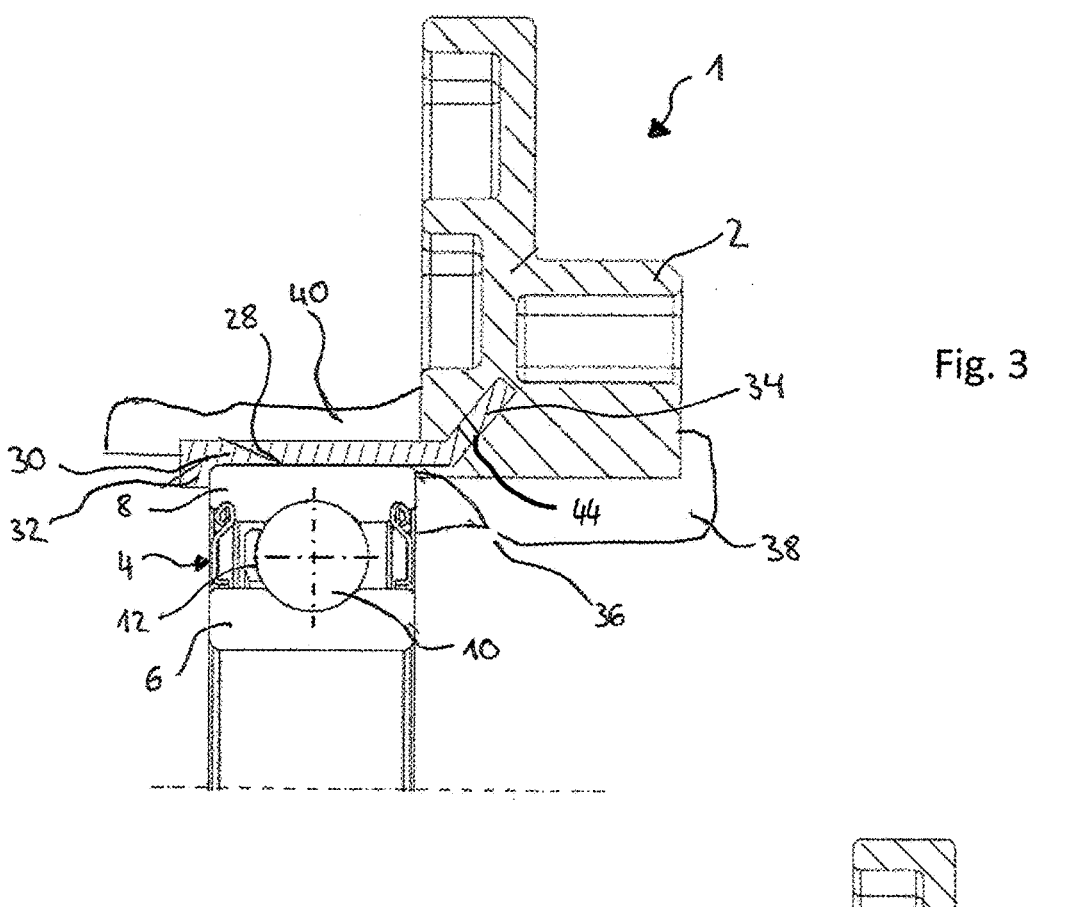
FIG. 3 is a sectional view of a bearing unit disposed in a bearing carrier, which bearing unit includes a retaining element according to a first embodiment of the disclose.
Figure 4:
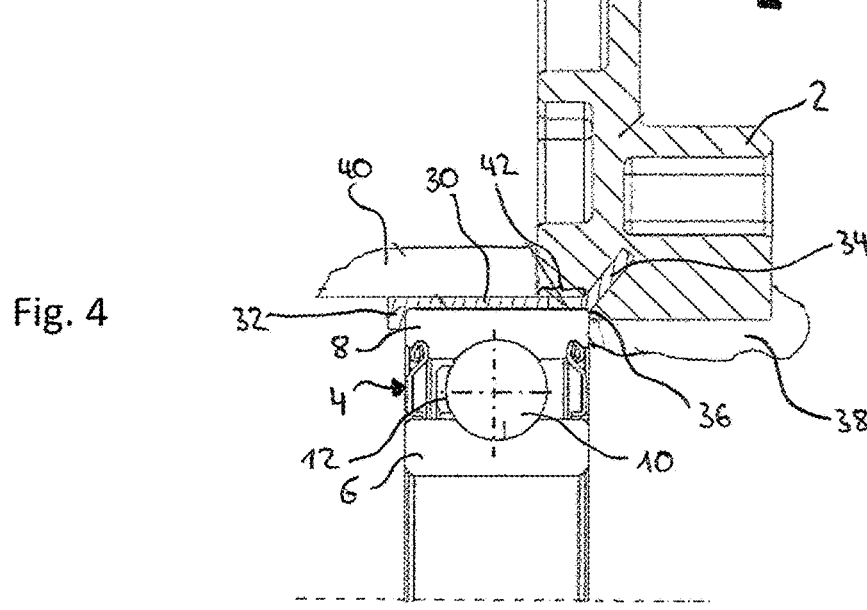
FIG. 4 is a sectional view of a bearing unit disposed in a bearing carrier, which bearing unit includes a retaining element, according to a second embodiment of the disclosure.

In order to simplify the attaching of the bearing unit 4 in the bearing carrier 2, or alternatively directly in the housing, and in particular to avoid compromising the bearing unit 4 by exposure to high temperatures and pressures, the bearing assembly 1 includes a retaining element 30 as is shown in FIGS. 3 and 4.

Here the retaining element 30, instead of the bearing unit 4, is embedded in the bearing carrier 2. High temperatures during the manufacturing of the bearing carrier 2, for example, by injection-molding, thus do not act on the bearing unit 4, but rather only affect the retaining element 30. The components of the bearing unit 4, such as, for example, the rolling elements 10, thus are protected from damage by high temperatures.

As is depicted in FIG. 3, the retaining element 30 can be disposed on an outer-diameter surface 28 of the stationary bearing ring 8. The retaining element 30 is preferably configured bowl-shaped, wherein a flange 32 surrounds the bearing ring 8 on an axial end surface.

The contact between the retaining element 30 and the bearing unit 2 can be effected by a friction or interference fit. For example, the bearing unit 4 and the retaining element 30 can be connected by a transition or press fit.

The retaining element 4 is preferably comprised of metal and has the same modulus of elasticity and/or the same coefficient of thermal expansion as the bearing ring 8. In this way, in operation there is no temperature-related change of the initial fit between the bearing ring 8 and the retaining element 30, and the connection between them remains even in operation.

In order to make possible an embedding of the retaining element 30 in the bearing carrier 2, and thus a connection between the bearing unit 4 and the bearing carrier 2, the retaining element 30 includes a projection 34 extending both radially and axially. This projection 34, which preferably has no direct contact with the bearing unit 4, is embedded in the bearing carrier 2.

During the manufacture of the bearing carrier 2, molding tools 38, 40 can surround the retaining element 30 and the bearing unit 4 such that the bearing unit 4 is protected from contact with the molding compound of the bearing carrier 2. The molding tools 38, 40 can also contain a cooling system in order to additionally cool the bearing unit 4 during the molding process. The bearing carrier 2 is molded around the retaining element 30 and in particular around the projection 34. In the embodiment shown in FIG. 3, only a small axial contact region 36 arises between the bearing carrier 2 and the bearing unit 4. In this embodiment, the entire bearing carrier 2 is axially adjacent to the bearing unit 4. In other words, the bearing carrier does not overlap the radially outer surface of the bearing unit 4.

Alternatively, as is depicted in FIG. 4, the bearing carrier 2 can include an overlapping region 42 with respect to the bearing unit 4. However, in this case there is also no direct contact between the bearing carrier 2 and the bearing unit 4, but rather the direct contact is effected only between the retaining element 30 and the bearing carrier 2. In this way the bearing unit 4 is also protected from high temperatures during the manufacture of the bearing carrier 2.

The retaining element 30 can include radially extending recesses 44 that are fillable with the material of the bearing carrier 2. Due to these recesses 44 a particularly advantageous connection is effected between the bearing unit 4, using the retaining element 30, and the bearing carrier 2, such that the bearing unit 4 and the bearing carrier 2 are rotationally fixed.

Due to the bearing assembly disclosed herein, it is possible to embed a bearing unit in a bearing carrier or a stationary component without negatively impacting the bearing unit by high temperatures during the molding process of the bearing carrier or of the stationary component.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved methods of forming bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Bearing assembly
2 Bearing carrier

4 Bearing unit
6 Inner ring
8 Outer ring
10 Rolling element
12 Cage
14 Receptacles
16 Flange
18 Shoulder
20 Recesses
22 Bridges
28 Radial outer surface
Retaining element
32 Flange
34 Projection
36 Contact region
38, 40 Molding tool
42 Overlapping region
44 Recess
What is claimed is:
1. A method of forming a bearing assembly comprising:
providing a bearing unit configured to support a rotatable component relative to a stationary component, the bearing unit including a stationary bearing ring and a rotatable bearing ring, and
overmolding a material onto a portion of a radial surface of the stationary bearing ring, the portion being less than an entirety of the radial surface of the stationary bearing ring, to form the stationary component in contact with less than the entirety of the radial outer surface of the stationary bearing ring,
wherein the portion is less than 75% of the entirety of the radial surface of the stationary bearing ring, and
wherein the overmolding includes overmolding the material onto less than a total area of an axial end face of the stationary bearing ring so that the stationary component covers less than the total area of the axial end face.
2. The method according to claim 1,
wherein the stationary component comprises a bearing carrier.
3. The method according to claim 1,
wherein the material comprises a thermoplastic or a thermoset or a metal alloy.
4. The method according to claim 1,
wherein the stationary bearing ring comprises an outer bearing ring.
5. The method according to claim 1,
wherein the overmolding includes placing the stationary bearing ring in a mold that covers at least 25% of the entire radial surface of the stationary bearing ring.
6. The method according to claim 5,
wherein the radial surface of the stationary bearing ring is a radially outer surface of the stationary bearing ring.
7. The method according to claim 1,
wherein the overmolding includes placing the stationary bearing ring in a mold that covers at least 25% of the entire radial surface of the stationary bearing ring,
wherein the stationary bearing ring comprises an outer bearing ring,
wherein the stationary component comprises a bearing carrier, and
wherein the material comprises a thermoplastic or a thermoset or a metal alloy.
8. A method of forming a bearing assembly comprising:
providing a bearing unit configured to support a rotatable component relative to a stationary component, the bearing unit including a stationary bearing ring and a rotatable bearing ring, mounting a retainer ring to a radial surface of the stationary bearing ring, and
overmolding a material onto the retainer ring to form the stationary component on the retainer ring so that the stationary component overlies a portion of the radial surface of the stationary bearing ring that is less than an entirety of the radial surface of the stationary bearing ring,
wherein the portion is less than 75% of the entirety of the radial surface of the stationary bearing ring,
wherein the retainer ring includes a portion that does not radially overlie the stationary bearing ring, and
wherein the overmolding completely covers the portion of the retainer ring with the material.
9. The bearing assembly according to claim 8, wherein the stationary bearing ring is an outer bearing ring.
10. The method according to claim 8,
including overmolding the material onto less than a total area of an axial end face of the stationary bearing ring so that the stationary component covers less than the total area of the axial end face.
11. The method according to claim 8,
wherein the overmolding includes placing the stationary bearing ring and the retainer ring in a mold that overlies at least 25% of the entire radial surface of the stationary bearing ring.
12. The method according to claim 11,
wherein the stationary bearing ring is an outer bearing ring.
13. The method according to claim 8,
wherein the overmolding includes placing the stationary bearing ring in a mold that overlies at least 25% of the entire radial surface of the stationary bearing ring,
wherein the stationary bearing ring comprises an outer bearing ring,
wherein the overmolding includes overmolding the material onto less than a total area of an axial end face of the stationary bearing ring so that the stationary component covers less than the total area of the axial end face,
wherein the stationary component comprises a bearing carrier, and
wherein the material comprises a thermoplastic or a thermoset or a metal alloy.
14. A method of forming a bearing assembly comprising:
providing a bearing unit configured to support a rotatable component relative to a stationary component, the bearing unit including a stationary bearing ring and a rotatable bearing ring,
mounting a retainer ring to a radial surface of the stationary bearing ring, and
overmolding a material onto the retainer ring to form the stationary component on the retainer ring,
wherein the material is overmolded onto less than a total area of an axial end face of the stationary bearing ring so that the stationary component covers less than the total area of the axial end face,
wherein the retainer ring includes a portion that does not radially overlie the stationary bearing ring, and
wherein the overmolding completely covers the portion of the retainer ring with the material.
15. The method according to claim 14,
wherein the overmolding includes placing the stationary bearing ring and the retainer ring in a mold that overlies at least 25% of the entire radial surface of the stationary bearing ring.

16. The method according to claim 14,
wherein the stationary bearing ring is an outer bearing
  ring.

* * * * *